(12) United States Patent
Dellow

(10) Patent No.: US 7,707,638 B2
(45) Date of Patent: *Apr. 27, 2010

(54) AUTONOMOUS SOFTWARE INTEGRITY CHECKER

(75) Inventor: Andrew Dellow, Gloucester (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 1817 days.

This patent is subject to a terminal disclaimer.

(21) Appl. No.: 10/354,891

(22) Filed: Jan. 30, 2003

(65) Prior Publication Data

US 2003/0182570 A1    Sep. 25, 2003

(30) Foreign Application Priority Data

Jan. 30, 2002    (EP)    .................... 02250644

(51) Int. Cl.
G06F 11/30    (2006.01)
G06F 17/30    (2006.01)
G06F 7/04    (2006.01)

(52) U.S. Cl. .................. 726/26; 713/188
(58) Field of Classification Search ............. 713/188; 463/29, 44; 726/26
See application file for complete search history.

(56) References Cited

U.S. PATENT DOCUMENTS

| | | | | |
|---|---|---|---|---|
| 4,183,085 A | * | 1/1980 | Roberts et al. ............... 705/76 |
| 5,070,479 A | * | 12/1991 | Nakagawa ..................... 714/11 |
| 5,181,245 A | * | 1/1993 | Jones .......................... 705/61 |
| 5,572,479 A | * | 11/1996 | Satou ..................... 365/230.06 |
| 5,933,497 A | * | 8/1999 | Beetcher et al. ............... 705/59 |
| 6,009,523 A | | 12/1999 | Owaki et al. ................. 713/200 |
| 6,138,236 A | * | 10/2000 | Mirov et al. .................. 726/26 |
| 6,201,731 B1 | * | 3/2001 | Kamp et al. ........... 365/185.02 |
| 6,253,324 B1 | * | 6/2001 | Field et al. ................... 713/187 |
| 6,311,273 B1 | | 10/2001 | Helbig, Sr. et al. .......... 713/200 |
| 6,775,778 B1 | * | 8/2004 | Laczko et al. ............... 713/194 |
| 2001/0054147 A1 | * | 12/2001 | Richards ..................... 713/172 |
| 2002/0049909 A1 | * | 4/2002 | Jackson et al. .............. 713/188 |
| 2002/0154718 A1 | * | 10/2002 | Fong et al. .................. 375/354 |
| 2005/0028004 A1 | * | 2/2005 | Dellow et al. ............... 713/200 |

FOREIGN PATENT DOCUMENTS

EP    0962850    8/1999
WO    WO 9845778 A2 * 10/1998

OTHER PUBLICATIONS

IBM Technical Disclosure Bulletin entitled, "Artificial Immunity for Personal Computers", vol. 34, No. 2, Jul. 1991.

* cited by examiner

*Primary Examiner*—Michael Pyzocha
(74) *Attorney, Agent, or Firm*—Lisa K. Jorgenson; Allen, Dyer, Doppelt, Milbrath & Gilchrist, P.A.

(57) ABSTRACT

A semiconductor integrated circuit includes a processor for executing application code from a memory and a verifier processor arranged to receive the application code via the same internal bus as the processor. The verifier processor performs a verification function to check that the application code is authentic. The verifier processor runs autonomously and cannot be spoofed as it receives the application code via the same internal bus as the main processor.

35 Claims, 3 Drawing Sheets

AUTONOMOUS SOFTWARE INTEGRITY CHECKER

FIELD OF THE INVENTION

The present invention relates to a memory security device, and in particular to the security of flash memory used in conditional access devices.

BACKGROUND OF THE INVENTION

In conditional access devices for pay television, or any other device using memory and requiring security, there is a need to provide flash memory but to avoid hacking. Hacking is the unauthorized placing of software in memory to override security features. A known way of attempting to prevent hacking is to use some form of checking instructed by ROM memory to ensure that an application code stored in flash memory is correct. Such a device is shown in FIG. 1.

A flash memory 2 has a boot sector 6 and an application sector 16. A CPU 10 is arranged to run application code from the flash memory 2 retrieved over an interface 12 via bus 8 EMI 20 and bus 18. The security is provided by the CPU 10 booting from a boot ROM 3 which contains code to check the boot sector 6 of the flash memory. This is done once by the CPU producing a function of the code in the boot sector and comparing with a stored signature on startup. The CPU then jumps to the code in the boot sector 6 if it passes the check. However, it is now known that there is a relatively simple way of hacking such a security arrangement. When the CPU 10 boots up using code from the ROM 3, the CPU checks that the code in the boot sector 6 is correct. The weakness is that the process of power on, CPU boot and checking the flash takes a predictable number of clock cycles of the CPU clock. Thus, to hack the system, a hacker places code in an unchecked part of the flash memory 2 and forces the CPU to read from that part of the memory after a predetermined number of clock cycles by fixing an external address line.

The CPU 10 thereafter runs from unchecked code and no further checks are conducted, because the verification of code is only conducted on boot up from the ROM 3.

SUMMARY OF THE INVENTION

It is an object of the present invention to overcome the problem of storing application code within devices that can be insecure and prone to hacking by storing unauthorized code.

An embodiment of the invention comprises an additional processor termed a verifier processor and code arranged to read data from a memory to be checked, to produce a function of that data, and to verify that function of the data against a stored code. The verifier processor is on the same device and has the same external interfaces as a CPU which runs application code from the memory. The advantage of using an additional processor on the same device as a CPU is that the system cannot be hacked by changing code stored in memory as the additional processor would then also receive changed application code which would not be verified.

The verifier processor is arranged to continually check the flash memory while the CPU executes from the flash memory. If the address lines of the device were redirected so that the CPU runs from unauthorized code, then the verifier processor would also be redirected to that unauthorized code which would not pass the check.

The additional processor preferably produces a hash of the application code stored in memory and uses signature techniques to verify the application code. The embodiment thus comprises an additional processor function which runs independently of a CPU but is within the same integrated circuit as that CPU and shares the same bus. The processor function analyzes the application code applied to the CPU and, if not authentic, issues a reset signal to reset the integrated circuit.

BRIEF DESCRIPTION OF THE DRAWINGS

An embodiment of the invention will now be described by way of example only and with reference to the figures in which.

DETAILED DESCRIPTION OF THE PREFERRED EMBODIMENTS

The Autonomous Flash Checker (AFC) comprises a processor whose purpose is to check or verify that application code stored in a flash memory 2 for execution by a CPU 10 is authentic and has not been changed or "hacked". Flash memory is used in many devices, but the preferred embodiment is a conditional access system for television broadcast.

In such systems it is important that application software stored in flash memory is authentic and has not been changed in any way by a hacker. Such changes could be to run code whereby the system decrypts received broadcast signals without requiring payment by the user. The AFC processor 22 thus analyzes the application code stored in flash memory to ensure the code is authentic.

Figure 1:
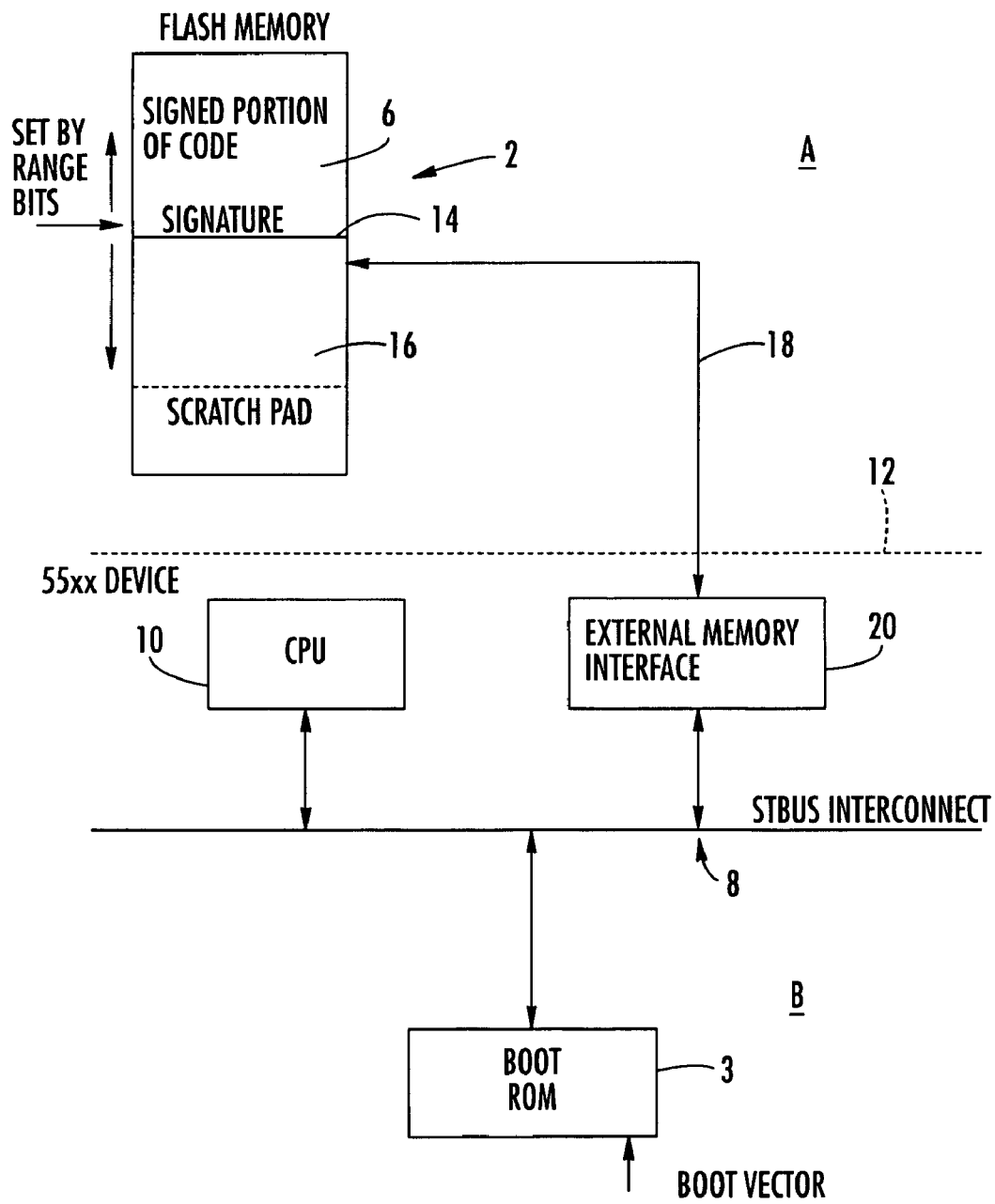
FIG. 1 is a block diagram showing a prior art known CPU memory arrangement for checking code.
Figure 2:
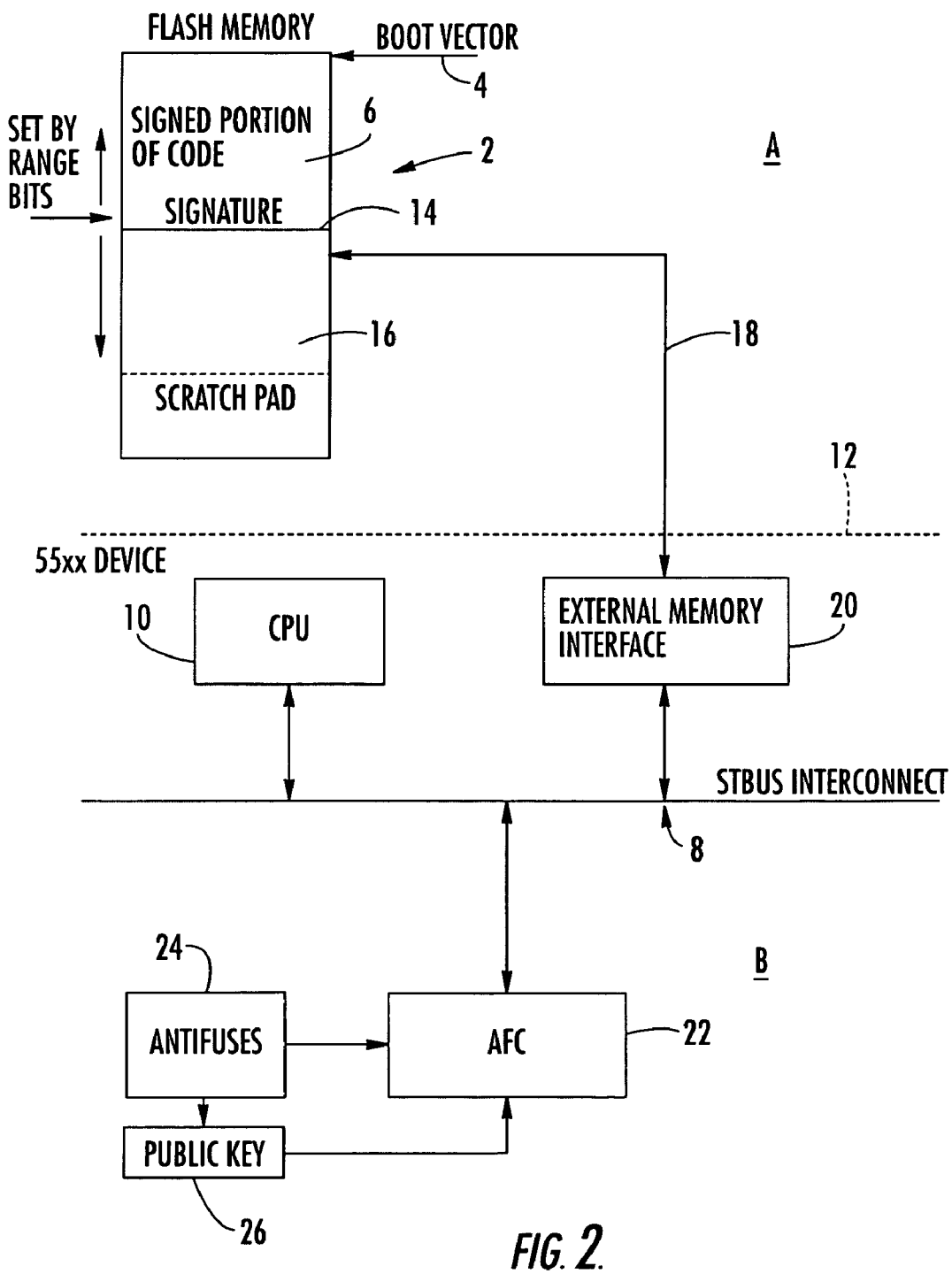
FIG. 2 is a block diagram showing an arrangement of a memory checking processor according to the present invention.

An integrated circuit embodying the invention is shown in FIG. 2, labelled device B. A processor (CPU) 10 is connected via an internal bus 8 and an external interface 20 via external connections on an interface 12 and bus 18 to a flash memory 2. The flash memory 2 contains application code in a boot sector 6 for execution by the CPU 10, signature portion 14 and an application sector 16. The signature portion 14 contains a signature that is a function of the application code in the boot sector 6 itself and is used for verification.

On power up of integrated circuit B, the CPU 10 is directed to the boot vector 4 of the flash memory 2 on a first integrated circuit, labelled circuit A. The application code is then retrieved over bus 18 and external memory interface 20 via internal bus 8 by the CPU 10 which executes the code. The application code is stored in a signed code portion 6 of the flash memory. It is noted that the AFC 22 is connected to the same internal bus 8 and external connections as the CPU, and so retrieves exactly the same code as the CPU without possibility of external interference. This is because the CPU, AFC processor and interconnect bus are all part of the same integrated circuit, labelled device B.

The CPU 10 and flash memory 2 operate in a known fashion, unless the AFC processor determines that the application code in flash memory 2 is not authentic. In this case, the AFC impairs operation of the device B by using a reset causing the device to reset and the boot sequence is restarted. Thus, if the application code has been tampered with, the set top box will repeatedly reboot and will not function to decrypt received TV signals. Other forms of impairing the operation of device B could be used such as disabling or stopping the device clock or otherwise limiting the functionality of the device.

Figure 3:
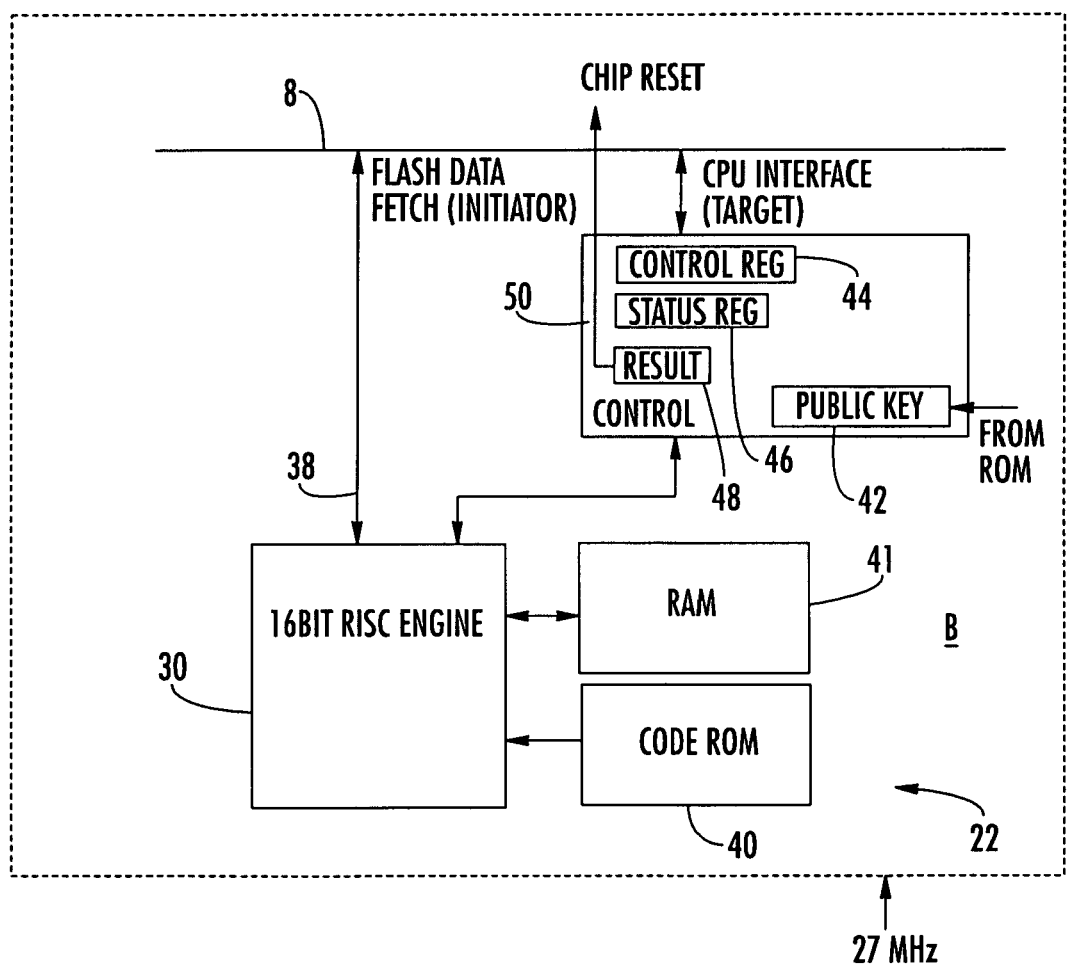
FIG. 3 is block diagram showing the memory checking processor of FIG. 2 in greater detail.

The operation of the AFC processor itself is achieved by producing a hash function and a signature of the application code using a public key from a public key storage 26 selected by antifuse 24 (FIG. 2) as will now be described with reference to FIGS. 2 and 3. The AFC 22 comprises a verifier processor such as a Risc processor 30 which executes code stored in code ROM 40 and uses RAM 41 for temporary storage. The code in code ROM 40 is only accessible by the verifier processor and instructs the Risc processor 30 to undertake the following steps:

1. Produce a hash of application code received from the flash memory;
2. Produce a signature function of the hashed code;
3. Verify that the signature is correct.

The verifier processor is not externally accessible other than in specific ways described later, and so cannot be hacked and only runs from the code in ROM which cannot be changed. If the signature is correct then the application code in flash memory is deemed authentic.

The steps set out above are undertaken continually; each set of steps comprising a cycle of the verifier processor. During each cycle the CPU 10 continues to operate as normal in retrieving and executing the application code over the same internal bus 8 as used by the verifier processor 30 over line 38. Accordingly, to avoid reducing the performance of the CPU 10, the verifier processor requests application code from the memory less frequently than the CPU, for example the verifier requests code once every 1,000 to 10,000 CPU requests. Also, the verifier requests are at pseudo random locations and at pseudo random times. This helps obscure the verifier requests among the CPU requests. The requests made at external connections at interface 12 for data from the flash thus comprise CPU requests and pseudo random requests at pseudo random times comparatively infrequently mixed together. It is thus all but impossible for a hacker to determine how to spoof the external address lines to direct the CPU to hacked code but the verifier to genuine code. The use of pseudo random locations and times makes spoofing harder. The requests to the flash memory themselves are indistinguishable, whether made by the CPU or verifier processor.

The first step of producing a hash of the application code uses a flash read circuit which is instructed by RISC processor 30 to retrieve the code over bus 8. The application code can be read sequentially, in circular or pseudo random fashion as specified by the code in ROM, and is provided to the RISC processor 30 over line 38. The hash function can be any one-way hash function which has the advantage that any small change in the application code will result in a large change in the hashed code, but is mathematically all but impossible to derive multiple changes that could be made to the application code such that the hashed code is unchanged. Preferably, the RISC processor 30 continually receives the application code from the flash in a pseudo-random read pattern, and uses a know hash function such as MD5.

On completion of the hash function, the second step is to produce a signature function of the hashed code. To do this, the RISC processor produces a function F (hashed code, public key) where the public key is selected from the public key storage 26 by antifuse 24 and provided at 42. The signature of the application code is retrieved from signature location 14 (FIG. 2) in the flash (having been created and pre-stored using the corresponding private key). A second function G (public key, signature) is then produced. The antifuses are arranged to select only one of a plurality of keys in the key storage 26. This allows a generic device B to be created but to be tailored by selecting just one of possible keys. The antifuses are known and are irreversible fuses.

The third step is then to verify the hashed code against the signature by the standard digital signature technique of comparing F (hashed code, public key) and G (public key, signature). The preferred algorithm is DSA. Provided that the signature is verified, then no action is taken. If the application code does not verify the signature, however, an impair function results at 48 a chip reset is issued over line 50, preventing the chip from operating further.

We have also appreciated that there may be a need to download new (authentic) code to the flash memory and that this should be provided for so that the AFC does not erroneously reject this new code. To allow this, the verifier processor must be stopped for M minutes, but again this could leave the possibility of a hack in which the AFC is permanently stopped. To prevent this, the code in ROM 40 causes the verifier processor to automatically issue a chip reset after M minutes, and starts the verification at the beginning of the new code in flash memory.

The only commands available to the CPU 10 to control the verifier processor 22 are: STOP, RESTART, PAUSE. Thereafter, the operation of the AFC processor is autonomous and largely in hardware, with the only software being in ROM 40 or RAM 41 which are only accessible by the RISC processor 30. We have appreciated, however, that these commands need to be available to the CPU to avoid contention and allow flash memory updates, but could open the possibility of hacks which permanently pause or stop the AFC or continually reset. For that reason, further preferred features are included.

A first preferred feature is to allow the CPU 10 to pause the verifier processor to avoid contention. However, we have appreciated that this could allow a hack in which the AFC is permanently paused. So the code in ROM 40 is configured only to allow N pauses in one cycle of checking the flash memory. Each pause can be around 1 second. If the count N is exceeded, a chip reset signal is sent. A further possible hack would be to block requests made by the verifier processor for code from the flash such that the verification process never completes. To prevent this, a watchdog function is incorporated in the code in ROM 40 such that a reset is issued if a cycle does not complete in a given time. The given time is predictable as it is known how long should be taken for a cycle and so this is programmed in ROM.

It could also be possible to hack the flash memory code such that the CPU continually instructs the verifier processor to stop and restart. To avoid this, the code in ROM does not allow the verifier processor to stop after a restart request so that a whole cycle of verification is conducted.

It is noted that the verifier processor has access to the RAM 41. This RAM is also on the same device as the CPU, ROM 40 and verifier processor so as to avoid the possibility of hacking this RAM, which is used to store temporary values during execution of the verification code in the ROM 40. The verifier processor only has two external connections to retrieve data and to issue resets. The reset is issued to the device B itself, so it cannot be hacked. The retrieval of code uses the same bus as the CPU, and so if hacked, it would not be verified as previously described.

That which is claimed is:

1. A semiconductor integrated circuit arranged to execute application code received from a memory via external connections, comprising:
    a processor configured to execute application code from the memory;
    an internal bus within the integrated circuit and configured to provide the application code to the processor from the external connections; and a verifier processor configured to receive the application code via the internal bus, continually process the application code, while the processor executes the application code from the memory independently of the verifier processor, using a verification function, impair the function of the integrated circuit if the application code does not satisfy the verification function, and request portions of the application code from the memory at intervals between requests by the processor for portions of the application code.

2. A semiconductor integrated circuit according to claim 1, wherein the verification function includes a hash function on the application code.

3. A semiconductor integrated circuit according to claim 1, wherein the verifier processor is configured to receive a stored secret from the memory and the verification function is a comparison of the secret and the processed application code.

4. A semiconductor integrated circuit according to claim 1, wherein the verification function comprises hashing the application code to produce hashed code, retrieving a signature of the code from a signature stored within the memory and verifying the hashed code and signature using a public key.

5. A semiconductor integrated circuit according to claim 1, wherein the verifier processor has a pause input configured to receive a pause signal from the processor, and is configured to impair the function of the integrated circuit if greater than a given number of pause signals are received in a given time.

6. A semiconductor integrated circuit according to claim 1, wherein the verifier processor has a stop input configured to receive a stop signal from the processor, and is configured to impair the function of the integrated circuit for a given time period after receiving a stop signal.

7. A semiconductor integrated circuit according to claim 1, wherein the verifier processor has a stop input and is configured to restart a given time period after a stop signal is received from the processor, and configured not to stop again until completing the verification function on the code at least once.

8. A semiconductor integrated circuit according to claim 1, wherein the verifier processor is configured to impair the function of the integrated circuit if the verification function is not completed within a predetermined time.

9. A semiconductor integrated circuit according to claim 1, wherein the verifier processor is configured to request portions of application code at less frequent intervals than the processor.

10. A semiconductor integrated circuit according to claim 1, wherein the verifier processor is configured to request portions of application code at pseudo-random times.

11. A semiconductor integrated circuit according to claim 1, wherein the verifier processor is configured to request portions of application code from pseudo-random locations in the memory.

12. A semiconductor integrated circuit according to claim 1, further comprising a ROM, wherein the verification function is defined by code in the ROM.

13. A semiconductor integrated circuit according to claim 12, wherein the ROM is only accessible by the verifier processor.

14. A semiconductor integrated circuit according to claim 12, further comprising a RAM configured to store temporary values when executing the verification function.

15. A semiconductor integrated circuit according to claim 1, wherein impairing the function of the integrated circuit comprises resetting the integrated circuit.

16. An integrated circuit for executing application code received from an external memory, the integrated circuit comprising:
a processor configured to execute application code from the memory;
an internal bus configured to provide the application code to the processor; and
a verifier processor configured to receive the application code via the internal bus, to continually process the application code, while the processor executes the application code independently of the verifier processor, using a verification function, to impair the operation of the integrated circuit if the application code does not satisfy the verification function, and to request portions of the application code from the memory at intervals between requests by the processor for portions of the application code.

17. An integrated circuit according to claim 16, wherein the verification function includes a hash function on the application code.

18. An integrated circuit according to claim 16, wherein the verifier processor is configured to receive a stored secret from the memory and the verification function is a comparison of the secret and the processed application code.

19. An integrated circuit according to claim 16, wherein the verification function comprises hashing the application code to produce hashed code, retrieving a signature of the code from a signature stored within the memory and verifying the hashed code and signature using a public key.

20. An integrated circuit according to claim 16, further comprising a ROM, wherein the verification function is defined by code in the ROM.

21. An integrated circuit according to claim 20, wherein the ROM is only accessible by the verifier processor.

22. An integrated circuit according to claim 20, further comprising a RAM configured to store temporary values when executing the verification function.

23. An integrated circuit according to claim 16, wherein impairing the operation of the integrated circuit comprises resetting the integrated circuit.

24. A method for executing application code received from an external memory, the method comprising:
executing application code from the memory with a processor;
providing the application code to the processor via an internal bus;
providing the application code to a verifier processor via the internal bus;
continually processing the application code with the verifier processor, while the processor executes the application code independent of the verifier processor, using a verification function; and
impairing operation of the integrated circuit if the application code does not satisfy the verification function, the verifier processor requesting portions of the application code from the memory at intervals between requests by the processor for portions of the application code.

25. A method according to claim 24, wherein the verification function includes a hash function on the application code.

26. A method according to claim 24, wherein the verifier processor receives a stored secret from the memory and the verification function is a comparison of the secret and the processed application code.

27. A method according to claim 24, wherein the verification function comprises hashing the application code to produce hashed code, retrieving a signature of the code from a signature stored within the memory and verifying the hashed code and signature using a public key.

28. A method according to claim 24, wherein the verifier processor impairs the operation of the integrated circuit if the verification function is not completed within a predetermined time.

29. A method according to claim 24, wherein the verifier processor requests portions of application code at less frequent intervals than the processor.

30. A method according to claim 24, wherein the verifier processor requests portions of application code at pseudo-random times.

31. A method according to claim 24, wherein the verifier processor requests portions of application code from pseudo-random locations in the memory.

32. A method according to claim 24, wherein the verification function is defined by code in a ROM.

33. A method according to claim 32, wherein the ROM is only accessible by the verifier processor.

34. A method according to claim 32, wherein temporary values are stored in a RAM when executing the verification function.

35. A method according to claim 24, wherein impairing the operation of the integrated circuit comprises resetting the integrated circuit.

* * * * *